(12) United States Patent
Hrycak et al.

(10) Patent No.: US 8,824,534 B2
(45) Date of Patent: Sep. 2, 2014

(54) METHOD FOR CHANNEL ESTIMATION

(75) Inventors: Tomasz Hrycak, Vienna (AT); Saptarshi Das, Bangalore (IN); Hans Georg Feichtinger, Mistelbach (AT); Gerald Matz, Vienna (AT)

(73) Assignees: Universitat Wien, Vienna (AT); Technische Universitat Wien, Vienna (AT)

( * ) Notice: Subject to any disclaimer, the term of this patent is extended or adjusted under 35 U.S.C. 154(b) by 186 days.

(21) Appl. No.: 13/582,509

(22) PCT Filed: Mar. 4, 2011

(86) PCT No.: PCT/AT2011/000109
§ 371 (c)(1),
(2), (4) Date: Sep. 4, 2012

(87) PCT Pub. No.: WO2011/106818
PCT Pub. Date: Sep. 9, 2011

(65) Prior Publication Data
US 2012/0327991 A1    Dec. 27, 2012

(30) Foreign Application Priority Data
Mar. 4, 2010    (EP) ..................................... 10450035

(51) Int. Cl.
*H04B 3/46*    (2006.01)
*H04L 25/02*    (2006.01)
*H04L 27/26*    (2006.01)
*H04L 5/00*    (2006.01)

(52) U.S. Cl.
CPC ............ *H04L 25/0224* (2013.01); *H04L 5/005* (2013.01); *H04L 25/024* (2013.01); *H04L 27/2647* (2013.01)

USPC ........................................................ 375/224

(58) Field of Classification Search
USPC ........................................ 375/224, 252, 341
See application file for complete search history.

(56) References Cited

U.S. PATENT DOCUMENTS

| 2009/0103666 A1* | 4/2009 | Zhao et al. ..................... 375/341 |
| 2012/0224498 A1* | 9/2012 | Abrishamkar et al. ....... 370/252 |

FOREIGN PATENT DOCUMENTS

EP    2 228 955 A1    9/2010

OTHER PUBLICATIONS

Philip Schniter, *Low-Complexity Equalization of OFDM in Doubly Selective Channels*, IEEE Transactions on Signal Processing, vol. 52, No. 4, Apr. 2004, pp. 1002-1011, also published as IEEE Transactions on Acoustics, Speevch and Signal Processing.

Luca Rugini, et al., *Low-Complexity Banded Equalizers for OFDM Systems in Doppler Spread Channels*, EURASIP Journal on Applied Signal Processing, vol. 2006, Article ID 67404, Accepted Apr. 30, 2006, pp. 1-13.

(Continued)

*Primary Examiner* — Jaison Joseph
(74) *Attorney, Agent, or Firm* — Stein IP, LLC

(57) ABSTRACT

The invention relates to a method of estimating BEM coefficients of the Channel taps of a transmission Channel of an OFDM System having a given pilot arrangement, comprising, at the receiver side of the transmission Channel, the Steps of a) subsampling a received OFDM symbol in the frequency domain into a set of subsequences, b) inverse Fourier transforming each subsequence into a transformed subsequence, and c) estimating Fourier coefficients of a truncated Fourier series expansion model of the Channel taps from the set of transformed subsequences.

10 Claims, 3 Drawing Sheets

(56) References Cited

OTHER PUBLICATIONS

Figure 1:
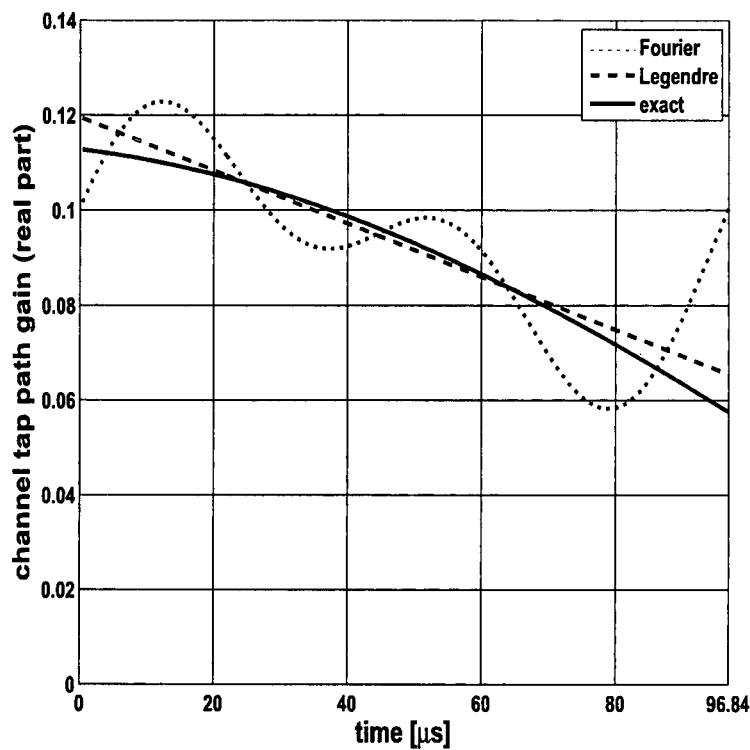

Chi-Min Li, et al., *Performance Analysis of Different HSDPA Equalizers Under the Measured Outdoor Channels*, Proceedings of 2007 International Symposium on Intelligent Signal Processing and Communication Systems Nov. 28, 2007-Dec. 1, 2007, pp. 794-797.

Tomasz Hrycak, et al., *Practical Estimation of Rapidly Varying Channels for OFDM Systems*, IEEE Transactions on Communications, vol. 59, No. 11, Nov. 2011, pp. 3040-3048.

Tomasz Hrycak, et al., *Low Complexity Equalization for Doubly Selective Channels Modeled by a Basis Expansion*, IEEE Transactions on Signal Processing, vol. 58, No. 11, Nov. 2010, pp. 5706-5719.

Kun Fang, et al., *Low-Complexity Block Turbo Equalization for OFDM Systems in Time-Varying Channels*, IEEE Transactions on Signal Processing, vol. 56, No. 11, Nov. 2008, pp. 5555-5566.

John A. C. Bingham, *Multicarrier Modulation for Data Transmission: An Idea Whose Time Has Come*, IEEE Communications Magazine, May 1990, pp. 5-8, and 11-14.

Imad Barhumi, et al., *Time-Varying FIR Equalization for Doubly Selective Channels*, IEEE Transactions on Wireless Communications, vol. 4, No. 1, Jan. 2005, pp. 202-214.

Imad Barhumi, et al., *MLSE and MAP Equalization for Transmission Over Doubly Selective Channels*, IEEE Transactions on Vehicular Technology, vol. 58, No. 8, Oct. 2009, pp. 4120-4128.

Tomasz Hrycak et al., *A Method for Channel Estimation*, 26 pages.

Patrick Robertson, et al., *The Effects of Doppler Spreads in OFDM (A) Mobile Radio Systems*, 1999, pp. 329-333.

Ye (Geoffrey) Li, et al., *Bounds on the Interchannel Interference of OFDM in Time-Varying Impairments*, IEEE Transactions on Communications, vol. 49, No. 3, Mar. 2001, pp. 401-404.

Mark Russell, et al., *Interchannel Interference Analysis of OFDM in a Mobile Enviomment*, IEEE Xplore, 1995, pp. 820-824.

Yang-Seok Choi, et al., *On Channel Estimation and Detection for Multicarrier Signals in Fast and Selective Rayleigh Fading Channels*, IEEE, Transactions on Communications, vol. 49, No. 8, Aug. 2001, pp. 1375-1387.

Xiadong Cai, et al., *Bounding Performance and Suppressing Intercarrier Interference in Wireless Mobile, OFDM*, IEEE Transactions on Communications, vol. 51, No. 12, Dec. 2003, pp. 2047-2056.

Alexei Gorokhov, et al., *Robust OFDM Receivers for Dispersive Time-Varying Channels: Equalization and Channel Acquisition*, IEEE Transactions on Communications, Vo. 52, No. 4, Apr. 2004, pp. 572-583.

Luca Rugini, et al., *Simple Equalization of Time-Varying Channels for OFDM*, IEEE Communications Letters, vol. 9, No. 7, Jul. 2005, pp. 619-621.

Åke Björck, *Numerical Methods for Least Squares Problems*, Society for Industrial and Applied Mathematics, 1996, title pages and pp. 303-311 and 334-335.

Georg Tauböck, et al., *LSQR-Based ICI Equalization for Multicarrier Communications in Strongly Dispersive and Highly Mobile Environments*, IEEE Xplore, 2007, 5 pages.

Youcef Saad, et al., *GMRES: A Generalized Minimal Residual Algorithm for Solving Nonsymmetric Linear Systems*, SIAM J. Sci. Stat. Comput., vol. 7, No. 3, Jul. 1986, pp. 856-869.

Christopher C. Paige, et al., *LSQR: An Algorithm for Sparse Linear Equations and Sparse Least Squares*, ACM Transactions on Mathematical Software, vol. 8, No. 1, Mar. 1982, pp. 43-71.

Arnold Neumaier, *Solving Ill-Conditioned and Singular Linear Systems: A Tutorial on Regularization*, SIAM Rev. vol. 40, No. 3, pp. 636-666, Sep. 1998.

Michail K. Tsatsanis, et al., *Modelling and Equalization of Rapidly Fading Channels*, International Journal of Adaptive Control and Signal Processing, vol. 10, 159-176, 1996, pp. 159-176.

Georgios B. Giannakis, et al., *Basis Expansion Models and Diversity Techniques for Blind Identification and Equalization of Time-Varying Channels*, Proceedings of the IEEE, Vo. 86, No. 10, Oct. 1998, pp. 1969-1986.

William C. Jakes, *Multipath Interferences*, Chapter 1 in William C. Jakes, ed, *Microwave Mobile Communications*, IEEE, Inc., 1974, title, table of contents, and pp. 13-78.

Thomas Zemen, et al., *Time-Variant Channel Equalization via Discrete Prolate Spherodial Sequences*, IEEE, pp. 1288-1292, 2003.

David J. Thomson, *Spectrum Estimation and Harmonic Analysis*, Proceedings of the IEEE, vol. 7, No. 9, Sep. 1982, pp. 1055-1096.

Gene H. Golub, et al., *Matrix Computations: Third Edition*, 1996, 169 pages.

I.S. Gradshteyn, et al., *Table of Integrals, Series, and Products*, Seventh Edition, 2007, 1-125.

Optimal Channel Estimation of MIMO/OFDM Systems in Time-varying Wireless Channels.

An Efficient Design of Doubly Selective Channel Estimation for OFDM Systems.

International Search Report dated Aug. 12, 2010, issued in corresponding International Application No. 10450035.0-1525.

Han Zhang, et al., *Optimal Channel Estimation of MIMO/OFDM Systems in Time-varying Wireless Channels*, 2008, pp. 288-291.

European Search Report dated Aug. 12, 2010, issued in corresponding European Application No. 10450034.3-1525.

Sinem Coleri, et al, *Channel Estimation Techniques Base on Pilot Arrangement in OFDM Systems*, IEEE Transactions on Broadcasting, vol. 48, No. 3, Sep. 2002, pp. 223-229.

Thomas Zemen, et al., *Time-Variant Channel Estimation Using Discrete Prolate Spheroidal Sequences*, IEEE Transactions on Signal Processing, vol. 53, No. 9, Sep. 2005, pp. 3597-3607.

Zijian Tang, et al., *Pilot-Assisted Time-Varying Channel Estimation for OFDM Systems*, IEEE Transactions on Signal Processing, vol. 55, No. 5, May 2007, pp. 2226-2238.

Zijian Tang, et al., *Pilot Schemes for Time-Varying Channel Estimation in OFDM Systems*, 2007, 5 pages.

Changyong Shin, et al., *An Efficient Design of Doubly Selective Channel Estimation for OFDM Systems*, IEEE Transactions on Wireless Communications, vol. 6, No. 10, Oct. 2007, pp. 3790-3802.

Hakan A. Cirpan, et al., *Maximum Likelihood Blind Channel Estimation in the Presence of Doppler Shifts*, IEEE Transactions on Signal Processing, vol. 47, No. 6, Jun. 1999, pp. 1559-1569.

Maxime Guillaud, et al., *Channel Modeling and Associated Inter-Carrier Interference Equalization for OFDM Systems with High Doppler Spread*, 2003, 4 pages.

T. Zemen, et al., *Time Variant Channel Equalization for MC-CDMA via Fourier Basis Function*, 2003, 8 pages.

Geert Leus, *On the Estimation of Rapidly Time-Varying Channels*, 4 pages.

Thomas Zemen, et al., *Time-Variant Channel Equalization via Discrete Prolate Spheroidal Sequences*, 2003, pp. 1288-1,292.

Deva K. Borah, et al, *Frequency-Selective Fading Channel Estimation with a Polynomial Time-Varying Channel Model*, IEEE Transactions on Communications, vol. 47, No. 6, Jun. 1999, pp. 862-873.

Arun P. Kannu, et al., *MSE-Optimal Training for Linear Time-Varying Channels*, 4 pages.

Arun P. Kannu, et al., *Design and Analysis of MMSE Pilot-Aided Cyclic-Prefixed Block Transmissions for Doubly Selective Channels*, IEEE Transactions on Signal processing, vol. 56, No. 3, Mar. 2008, pp. 1148-1160.

*A Method for Channel Equalization*, 39 pages.

David Gottlieb, et al., *On the Gibbs Phenomenon and its Resolution*, SIAM Review vol. 39, No. 4, Dec. 1997, pp. 644-668.

Tobin A. Driscoll, et al., *A Padé algorithm for overcoming the Gibbs phenomenon*, Numerical Algorithms, vol. 26, 2001, pp. 77-92.

Neal C. Gallagher, et al., *A Novel Approach for the Computation of Legendre Polynomial Expansions*, 1978, pp. 105-106.

Bernie D. Shizgal, et al., *Towards the resolution of the Gibbs phenomena*, Journal of Computational and Applied Mathematics, vol. 161, 2003, pp. 41-65.

Tomasz Hrycak, et al. *Low-Complexity Time-Domain ICI Equalization for OFDM Communications over Rapidly Varying Channels*, pp. 1767-1771.

M. Abramowitz, et al., *Handbook of Mathematical Functions with Formulas, Graphs, and Mathematical, Tables*, Dec. 1972, 11 pages.

Eitan Tadmor, *Filters, mollifiers and the computation of the Gibbs phenomenon*, Acta Numerica, 2007, pp. 305-379.

(56) References Cited

OTHER PUBLICATIONS

IEEE Computer Society, et al. *Part 16: Air Interface for Fixed and Mobile Broadband Wireless Access Systems. Amendment 2: Physical and Medium Access Control Layers for Combined Fixed and Mobile Operation in Licensed Bands*, Feb. 28, 2006, 864 pages.

John P. Boyd, *Chebyshev and Fourier Spectral Methods*, Second Edition, 2000, 611 pages.

I.S. Gradshteyn, et al., *Table of Integrals, Series, and Products*, Seventh Edition, 2007, 1221 pages.

* cited by examiner (a)

(b)

(a)

(b)

METHOD FOR CHANNEL ESTIMATION

CROSS-REFERENCE TO RELATED APPLICATIONS

This application is a national stage of International Application No. PCT/AT2011/000109, filed Mar. 4, 2011, which claims the benefit of European Application No. 10450 035.0, filed Mar. 4, 2010, in the European Patent Office. All disclosures of the document(s) named above are incorporated herein by reference.

INTRODUCTION

1. Field of the Invention

The present invention relates to a method of estimating BEM coefficients of the channel taps of a transmission channel of an OFDM system.

2. Background of the Invention

Orthogonal frequency-division multiplexing (OFDM) is a popular multicarrier modulation technique with several desirable features, e.g. robustness against multipath propagation and high spectral efficiency. OFDM is increasingly used in high-mobility wireless communication systems, e.g. mobile WiMAX (IEEE 802.16e), WAVE (IEEE 802.11p), and DVB-T (ETSI EN 300 744). Usually, OFDM systems are designed so that no channel variations occur within an individual OFDM symbol duration. Recently, however, there has been an increasing interest in rapidly varying channels, with the channel coherence time less than the OFDM symbol duration. Rapid channel variations are caused by, for example, user mobility or carrier frequency offsets.

Rapidly varying channels act like time-varying filters with a finite impulse response (FIR). In the terminology of multicarrier communications, time-invariant FIR channels are known as frequency selective, while time-varying FIR channels are known as doubly selective.

In the case of frequency-selective channels in OFDM systems, estimation in the frequency-domain is unmatched in simplicity and accuracy, see [1]. In the case of doubly-selective channels, the channel taps change with time. The Basis Expansion Model (BEM) is commonly used to model doubly selective channels, see [2, 3], [4, 5]. The BEM approximates the channel taps by combinations of prescribed basis functions in the time domain. In this context, channel estimation amounts to approximate computation of the basis coefficients. Several bases have been proposed for modeling doubly-selective channel taps. The BEM with complex exponential (CE-BEM) [6, 7] uses a truncated Fourier series, and is remarkable because the resulting frequency-domain channel matrix is banded. However, this method has a limited accuracy due to a large modeling error. Specifically, [2, 8] observe that the reconstruction with a truncated Fourier series introduces significant distortions at the boundaries of the data block. The errors are due to the Gibbs phenomenon, and manifest themselves as a spectral leakage, especially in the presence of significant Doppler spreads. A more suitable exponential basis is provided by the Generalized CE-BEM (GCE-BEM) [9], which employs complex exponentials oversampled in the frequency domain. A basis of discrete prolate spheroidal wave functions is discussed in [2, 10]. Finally, the polynomial BEM (P-BEM) is presented in [11]. Definitive references on pilot-aided transmission in doubly-selective channels are [12, 13].

For channels varying at the scale of one OFDM symbol duration, a general framework for estimation of the BEM coefficients is developed in [3]. With L channel taps, the method requires $O(L^2)$ operations and $O(L^2)$ memory.

Contemporary broadband outdoor applications use scalable OFDM, in which the number of subcarriers increases with the available bandwidth, while keeping the symbol duration and the intercarrier frequency spacing fixed. This is accomplished by increasing the sampling rate, which in turn increases the number of discrete multipaths L. For example, mobile WiMAX (IEEE 802.16e) with K subcarriers, typically exhibits a discrete path delay of at least K/32, see [14]. Therefore it is important to develop estimation algorithms, whose computational and memory requirements scale with the number of OFDM subcarriers.

OBJECT OF THE INVENTION

It is an object of the invention to devise a method for estimating the BEM coefficients of the channel taps in an OFDM system with less computational and less memory requirements than the state of the art, in particular when scaling with the number of OFDM subcarriers.

SUMMARY OF THE INVENTION

According to the invention this object is achieved with a method of estimating BEM coefficients of the channel taps of a transmission channel of an OFDM system having a given pilot arrangement, comprising, at the receiver side of the transmission channel, the steps of a) subsampling a received OFDM symbol in the frequency domain into a set of subsequences, b) inverse Fourier transforming each subsequence into a transformed subsequence, and c) estimating Fourier coefficients of a truncated Fourier series expansion model of the channel taps from the set of transformed subsequences.

A particularly preferred embodiment of the invention for estimating BEM coefficients other than CE-BEM coefficients comprises the further step of d) calculating said BEM coefficients from said estimated Fourier coefficients.

Preferably, said pilot arrangement is a frequency domain Kronecker delta arrangement; and preferably said BEM coefficients are coefficients of an expansion model based on Legendre polynomials.

Further preferred embodiments of the invention comprise one of more of the following features:

step a) is made according to $$\tilde{Y}_d[i] = Y[k_0 + D^+ + d + iI],$$

with $i=0, \ldots, L-1$; $d=0, \ldots, D-1$; $I=K/L$; and $D^+ = \lfloor D/2 \rfloor$, Y being the received symbol in the frequency domain,
K being the symbol length,
D being the number of subsequences,
L being the number of channel taps,
$k_0$ being an offset, and
$\tilde{Y}_d$ being the dth subsequence;

step b) is done by means of an IDFT;

step c) is made according to $$\hat{H}_l[d] = \frac{1}{a_0 \sqrt{L}} e^{j2\pi \frac{l(k_0+D-1)}{K}} \tilde{y}_{d-D^-}[l],$$

$\tilde{y}_{d-D^-}[l]$ being the $(d-D^-)$th transformed subsequence, with $l=0, \ldots, L-1$, and $\hat{H}_l[d]$ being the dth Fourier coefficient of the lth channel tap;

step d) is made by applying the M×D projection matrix with the entries equal to the Fourier coefficients of the basis functions;

step d) is made by applying the Moore-Penrose pseudoinverse of the D×M matrix with the entries equal to the basis coefficients of the Fourier modes.

In this way, the invention develops a novel systematic approach to wireless channel estimation, which is aimed at channels varying on the scale of a single OFDM symbol duration. In short, from the pilot information the Fourier coefficients of the channel taps are computed, and then the BEM coefficients of the taps. Estimation of the Fourier coefficients is FFT-based, and therefore fairly easy to implement in hardware. A preferred basis is that of the Legendre polynomials, but the method allows arbitrarily chosen bases. The method uses a frequency-domain Kronecker delta (FDKD) pilot arrangement, see [12].

The main advantages of the invention can be summarized as follows:

A pilot-aided method for channel estimation in OFDM systems is proposed, which explicitly separates the computation of the Fourier coefficients of the channel taps, and a subsequent computation of the BEM coefficients of the channel taps.

A fast and accurate algorithm for approximate computation of the Fourier coefficients of the channel taps from the receive signal using an FDKD-type pilot placement is formulated.

Explicit formulas for the BEM coefficients in terms of the Fourier coefficients are derived. A preferred basis is that of the Legendre polynomials.

With L channel taps, the proposed method requires overall $O(L \log L)$ operations and $O(L)$ memory per OFDM symbol, which is the best possible up to the order of magnitude.

Previously published methods, e.g. [3], require $O(L^2)$ operations and memory. The improvement in operation count from $O(L^2)$ to $O(L \log L)$ is remarkable. For example, mobile WiMAX with K=2048 subcarriers exhibits a typical discrete path delay of L=K/8=256, see [14]. In this case, the operation count of the proposed algorithm is lower by approximately a factor of $L \log L=32$, see Subsection 4.5 for details. Moreover, reducing the memory use from $O(L^2)$ to $O(L)$ further accelerates the execution, since the computations better utilize a fast cache.

The proposed algorithm does not reconstruct the full channel matrix, but only estimates the BEM coefficients of the channel taps. It can be used with a novel equalization algorithm, devised by the same inventors and described in a copending patent application filed on the same day [15], which only uses the BEM coefficients. In this way, the whole transmission is efficient in terms of both computational complexity and memory. If needed, the channel matrix can be easily reconstructed from the BEM coefficients. However, reconstruction of the full channel matrix with K subcarriers requires O(LK) operations and memory, and dramatically increases the use of resources.

Extensive computer simulations show that this scheme is superior to estimation with a BEM using complex exponentials (CE-BEM) [13], and the method presented in [3]. At higher mobile velocities, this method is better than conventional time-invariant least squares (LS) estimation [1]. Transmissions are typically simulated for a user velocity of 300 km/h, and energy per data bit to noise spectral density ($E_b/N_0$) of 20 dB.

SHORT DESCRIPTION OF THE DRAWINGS

Figure 2:
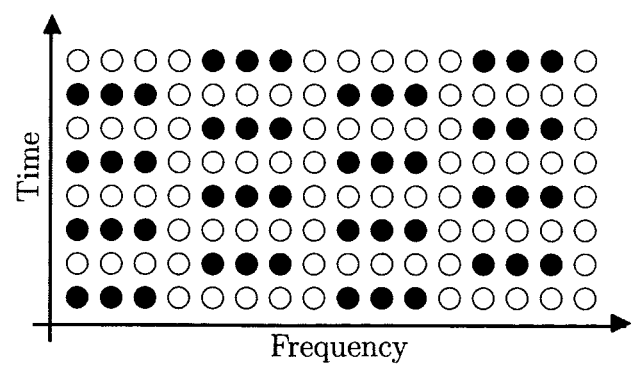

The invention will now be described in detail under reference to the enclosed drawings in which:

FIG. 1 shows a typical channel tap (real part) across one OFDM symbol, the normalized Doppler equals 0.2;

FIG. 2 shows an illustration of the proposed pilot arrangement with K=16, L=2, and D=2 ('○' represents data symbols and '●' represents pilot symbols). Only the central pilot in each block is non-zero. The offset $k_0$ is chosen equal to 0 and 4 in the even and odd symbol periods, respectively;

FIG. 3a shows NMSE versus receiver velocity, and FIG. 3b shows BER versus receiver velocity, for a fixed SNR of $E_b/N_0$=20 dB; and FIG. 4a shows NMSE versus SNR, and FIG. 4b shows BER versus SNR, for a fixed receiver velocity of 300 km/h.

DETAILED DESCRIPTION OF THE INVENTION

1 Theoretical Foundations of the Estimation Algorithm 1.1 Overview

A systematic framework for channel estimation in OFDM systems with significant channel variations within one OFDM symbol duration is developed. This task is divided into two separate steps, pilot-aided estimation of the Fourier coefficients of the channel taps.

estimation of the BEM coefficients of the channel taps.

1.2 Fourier Coefficients of the Channel Taps

Pilot symbol assisted modulation (PSAM) is used, with uniformly distributed blocks of pilot sub-carriers, each block having an FDKD pilot arrangement [12,13]. Pilots are inserted in every OFDM symbol in order to capture rapid variations of path gains. The first few Fourier coefficients of the channel taps are computed for each individual OFDM symbol. In Subsection 3.3, an efficient and accurate method for estimation of the Fourier coefficients of the channel taps from the receive signal is derived. The Fourier coefficients are computed using FDKD-type pilot carriers, see Subsections 3.1 and 3.3. The crucial point is that equation (13) used for the estimation of the Fourier coefficients does not involve unknown data symbols, so the Fourier coefficients depend only on the known pilot values.

A straightforward reconstruction of the channel taps as truncated Fourier series from the estimated Fourier coefficients is inaccurate. This problem is well known, and is commonly referred to as the Gibbs phenomenon. In the context of wireless channels, the failure of reconstruction with the Fourier basis is discussed in detail in [8]. However, it turns out that the information content of the Fourier coefficients can be used more effectively than in the straightforward approach, as is explained in the next subsection.

1.3 BEM Coefficients of the Channels Taps

The second stage is to estimate BEM coefficients of the channel taps from their Fourier coefficients in a way which remedies the Gibbs phenomenon. Several accurate algorithms have been proposed for overcoming the Gibbs phenomenon, see [16], [17] or [18]. A preferred basis is that of the Legendre polynomials adapted to individual OFDM symbols (see Subsection 3.4 for details), but not to the exclusion of other options, see e.g. [16]. An a priori assumption is made that the channel taps are analytic, but not necessarily periodic. Such functions can be represented by a rapidly converging expansion known as the Legendre series. Specifically, the Legendre series of an analytic function converges exponentially fast, see [19], p. 52, Theorem 10. A truncated Fourier series is converted into a truncated Legendre series by orthogonal projection. No truncated Fourier series is ever formed. Instead, the Legendre coefficients are computed from the Fourier coefficients by applying a matrix, whose entries are derived in Subsection 3.4. Specifically, the matrix entries are the Legendre coefficients of complex exponentials, and have explicit expressions in terms of the spherical Bessel functions of the first kind [20].

Although the Legendre coefficients are computed from the Fourier coefficients, a truncated Legendre series is in fact more accurate than a truncated Fourier series with a similar number of terms. The quality of the reconstruction with the truncated Legendre series is illustrated in FIG. 1, where the real part of a typical channel tap is plotted along with its approximation by a truncated Fourier series and a truncated Legendre series. In FIG. 1, a two-term Legendre series is used, which amounts to a linear function, and a three-term Fourier series, see Section 3 for details. The improvement can be explained by a dramatic difference in approximation properties of the two bases considered. In the case of a non-periodic function, the approximation error of the truncated Fourier series cannot be made arbitrarily small. On the other hand, the Legendre series converges exponentially fast.

Numerical simulations further confirm that for doubly-selective channels estimation with a truncated Legendre series is dramatically more accurate than the reconstruction with a truncated Fourier series.

2 System Model

2.1 Transmitter-Receiver Model

An equivalent baseband representation of a single-antenna OFDM system with K subcarriers is considered. A sampling period of $T_s=1/B$ is assumed, where B denotes the transmit bandwidth. A cyclic prefix of length $L_{cp}$ is used in every OFDM symbol. $L_{cp}$ is chosen so large that $L_{cp}T_s$ exceeds the channel's maximum delay, in order to avoid inter symbol interference (ISI). Consequently, throughout this paper, we deal with one OFDM symbol at a time.

Each subcarrier is used to transmit a symbol $A[k]$ ($k=0, \ldots, K-1$) from a finite symbol constellation. A subset of these symbols serves as pilots for channel estimation (cf. Section 3.3). The OFDM modulator uses the inverse discrete Fourier transform (IDFT) to map the frequency-domain transmit symbols $A[k]$ to the time-domain transmit signal $x[n]$ $$x[n] = \frac{1}{\sqrt{K}} \sum_{k=0}^{K-1} A[k] e^{j2\pi \frac{nk}{K}}, \quad (1)$$

$n=-L_{cp}, \ldots, K-1$.

After discarding the cyclic prefix, the receive signal satisfies $$y[n] = \sum_{l=0}^{L-1} h_l[n]x[n-l] + w[n], n = 0, \ldots, K-1. \quad (2)$$

Here, $w[n]$ denotes circularly complex additive white Gaussian noise (AWGN) of variance $N_0$, $h_l[n]$ is the complex channel tap associated with delay l, and L is the channel length (maximum discrete-time delay). Consequently, the channel's maximum delay equals $(L-1)T_s$. For simplicity, the worst-case assumption $L=L_{cp}$ is made. The OFDM demodulator performs a DFT to obtain the frequency-domain receive signal $$Y[n] = \frac{1}{\sqrt{K}} \sum_{n=0}^{K-1} y[n] e^{-j2\pi \frac{nk}{K}} = \sum_{l=0}^{L-1} (H_l * X_l)[k] + W[k], \quad (3)$$

where * denotes the cyclic convolution, and $k=0, \ldots, K-1$. In this expression, $Y[k]$, $H_l[k]$, $X_l[k]$, and $W[k]$ denote the DFT of $y[n]$, $h[n]$, $x[n-l]$, and $w[n]$, respectively. Specifically, $$H_l[k] = \frac{1}{\sqrt{K}} \sum_{n=0}^{K-1} h_l[n] e^{-j2\pi \frac{nk}{K}} \quad (4)$$

are the Fourier coefficients of the individual channel taps, and $$X_l[k] = e^{-j2\pi \frac{lk}{K}} A[k]. \quad (5)$$

2.2 BEM with the Legendre Polynomials

Each channel tap $h_l[n]$ is modeled as a linear combination of the first M Legendre polynomials rescaled to a single OFDM symbol duration (without the cyclic prefix)

$$h_l[n] = \sum_{m=0}^{M-1} b_{lm} p_m[n], l = 0, \ldots, L-1, \quad (6)$$

where $b_{lm}$ is the mth Legendre coefficient of the lth channel tap, and M is the BEM model order. Furthermore, $$p_m[n] = p_m(nT_s), \quad (7)$$

and, $$p_m(t) = P_m\left(\frac{2t}{KT_s} - 1\right), 0 \le t \le KT_s, \quad (8)$$

where $P_m$ is the Legendre polynomial of degree m, as defined in Appendix.

3 Proposed Channel Estimator

3.1 Analysis of Intercarrier Interactions

In this system model, channel estimation amounts to computing the LM BEM coefficients $\{b_{lm}\}$ from the receive signal $Y[k]$ ($y[n]$) and the pilot symbols. First the Fourier coefficients of the channel taps (cf. (4)) are estimated, and then approximate BEM coefficients from the Fourier coefficients are computed, as discussed in Section 3.4.

For a fixed positive integer D, the channel taps are approximated with their D-term Fourier series $$h_l[n] \approx \sum_{d=D^-}^{D^+} H_l[d] e^{j2\pi \frac{dn}{K}}, \quad (9)$$

where $D^-=-\lfloor(D-1)/2\rfloor$ and $D^+=\lfloor D/2 \rfloor$ ($\lfloor \cdot \rfloor$ denotes the floor operation). Clearly, $D^- \le 0 \le D^+$, and $D^+-D^-=D-1$. The representation of the channel taps described by equation (9) is commonly known as the Basis Expansion Model with complex exponentials (CE-BEM) [6, 7]. This model is used only for computation of the Fourier coefficients of the channel taps, but not for reconstruction of the taps themselves. Combining (2), (3), (5) and (9), it is obtained $$Y[k] = \sum_{l=0}^{L-1} \sum_{d=D^-}^{D^+} H_l[d] X_l[k-d] + \tilde{W}[k] \quad (10)$$

$$= \sum_{l=0}^{L-1} \sum_{d=D^-}^{D^+} H_l[d] e^{-j2\pi \frac{l(k-d)}{K}} A[k-d] + \tilde{W}[k],$$

$$= \sum_{d=D^-}^{D^+} A[k-d] \sum_{l=0}^{L-1} H_l[d] e^{-j2\pi \frac{l(k-d)}{K}} + \tilde{W}[k],$$

where k=0, ..., K−1, and $\tilde{W}[k]$ denotes the AWGN W [k] combined with the approximation error resulting from (9). From the above equation, it is noticed that the value Y[k] depends only on the 2D−1 transmit symbols $A[k-D^+]$, ..., $A[k-D^-]$ at the neighboring subcarriers.

3.2 Pilot Arrangement

It is assumed that $$I = \frac{K}{L}$$ (11)

is an integer, which can always be achieved by an appropriate choice of L. An FDKD pilot arrangement is used. Within each OFDM symbol, pilots are distributed the frequency domain in L blocks of size 2D−1 each, uniformly spaced every I subcarriers. Of course, this is only possible if 2D−1≤I. Denoting the location of the first pilot subcarrier by $k_0$, 0≤$k_0$≤I−(2D−1), the pilot locations have the form $$k_0 + q + iI, \quad (11)$$

where q=0, ..., 2D−2, and i=0, ..., L−1. An example of such an arrangement is shown in FIG. 2. Within each block, all the pilot values are zero, except for the central pilot, which is set to a value $a_0$ common to all blocks. Thus only the L symbols $A[k_0+D-1+iI]$, i=0, ..., L−1, carry non-zero pilots.

3.3 Estimation of Fourier Coefficients

D length-L subsequences of the frequency-domain receive signal Y[k] are created by uniform subsampling as follows $$\tilde{Y}_d[i] = Y[k_0 + D^+ + d + iI], \quad (12)$$

for i=0, ..., L−1 and d=0, ..., D−1. From (10), it is obtained $$\tilde{Y}_d[i] = \sum_{d'=D^-}^{D^+} A[k_0 + D^+ + d + iI - d'] \times \quad (13)$$

$$\sum_{l=0}^{L-1} H_l[d'] e^{-j2\pi \frac{l(k_0+D^+ + d + iI - d')}{K}} + \tilde{W}_d[i],$$

where $\tilde{W}_d[i]=\tilde{W}[k_0+D^++d+iI]$. In view of the chosen pilot arrangement (11), it is clear that for any d=0, ..., D−1 and i=0, ..., L−1, the summation in formula (13) involves the known pilot symbols, but no data symbols. Moreover, if d'=d+$D^-$, then $$A[k_0+D^++d+iI-d']=A[k_0+D-1+iI]=a_0. \quad (14)$$

By construction, all the other pilot symbols in (13) are zero, and (13) reduces to the following $$\tilde{Y}_d[i] = a_0 \sum_{l=0}^{L-1} H_l[d + D^-] e^{-j2\pi \frac{l(k_0+D-1+iI)}{K}} + \tilde{W}_d[i]. \quad (15)$$

Performing the length-L IDFT with respect to the variable i, it is obtained $$\tilde{y}_d[l] = \frac{1}{\sqrt{L}} \sum_{i=0}^{L-1} \tilde{Y}_d[i] e^{j2\pi \frac{il}{L}} \quad (16)$$

$$= a_0 \sqrt{L} H_l[d + D^-] e^{-j2\pi \frac{l(k_0+D-1)}{K}} + \tilde{w}_d[l],$$

where $\tilde{y}_d[l]$ and $\tilde{w}_d[l]$ denote the IDFTs of $\tilde{Y}_d[i]$ and $\tilde{W}_d[i]$, respectively. Ignoring the noise term $\tilde{w}_d[l]$, the solution of the system of DL equations (16) gives approximate Fourier coefficients of the channel taps $$\hat{H}_l[d] = \frac{1}{a_0 \sqrt{L}} e^{j2\pi \frac{l(k_0+D-1)}{K}} \tilde{y}_{(d-D^-)}[l], \quad (17)$$

for, d=$D^-$, ..., $D^+$, and l=0, ..., L−1. It is observed that the computation of the quantities $\hat{H}_l[d]$ is accomplished using D IDFTs of length L, where typically D≤3. By way of contrast, previous approaches to the computation of the Fourier (CE-BEM) coefficients from the receive signal over one OFDM symbol require $O(L^2)$ operations and memory, see Subsection IV-B in [3].

Reconstruction of the channel taps as truncated Fourier series using equation (9) and the estimated Fourier coefficients (17) is inaccurate because of the Gibbs phenomenon, see FIG. 1. In the next subsection, a simple method is presented for the mitigation of the Gibbs phenomenon by replacing the complex exponentials with a more suitable basis.

3.4 Estimation of the BEM Coefficients

The channel taps are regarded as analytic functions of time. They are represented by means of a rapidly converging expansion known as the Legendre series [19]. Other suitable bases which well approximate the channel taps can also be used in the same framework. The method of estimating the BEM coefficients from the Fourier coefficients for the basis consisting of the Legendre polynomials is illustrated. Two methods are described for this purpose. The first method uses the orthogonal projection onto the subspace generated by the basis functions. The second is an inverse reconstruction method. Both methods have the same computational complexity and memory requirements.

3.4.1 Projection

It turns out, that one of the simplest methods to reduce the Gibbs phenomenon is to convert a truncated Fourier series into a truncated Legendre series by orthogonal projection. This is accomplished by a linear mapping transforming the Fourier coefficients into approximate Legendre coefficients, without ever creating the truncated Fourier series (9) explicitly.

In order to derive this linear mapping, let us project the truncated Fourier expansion (see equation (9)) onto the rescaled Legendre polynomials $p_m$ (see equation (8)), which form an orthogonal basis on the interval $[0, KT_s]$. The mth Legendre coefficient of the exponential function $$e^{j2\pi \frac{d}{KT_s}t}$$

equals $$\frac{\int_0^{KT_s} e^{j2\pi \frac{d}{KT_s}t} p_m(t)\,dt}{\int_0^{KT_s} p_m^2(t)\,dt} = \frac{(-1)^d \int_{-1}^1 e^{j\pi dx} P_m(x)\,dx}{\int_{-1}^1 P_m^2(x)\,dx} \quad (18)$$

$$= j^m(2m+1)(-1)^d j_m(\pi d),$$

where $j_m$ is the spherical Bessel function of the first kind and order m, see Appendix for a definition. Combining this equation with (6) and (9), it is obtained $$\hat{b}_{lm} = j^m(2m+1)\sum_{d=D^-}^{D^+}(-1)^d j_m(\pi d)\hat{H}_l[d], \quad (19)$$

where $\hat{b}_{lm}$ denotes the estimate of $b_{lm}$. The linear mapping (19) amounts to applying the M×D matrix J with entries $$J_{md} = j^{(m-1)}(2m-1)(-1)^d j_{m-1}(\pi(d-D^+)) \quad (20)$$

to the length-D vector $(\hat{H}_l[D^-],\ldots,\hat{H}_l[D^+])^T$ of the estimated Fourier coefficients, resulting in the length-M vector $(\hat{b}_{l0},\ldots,\hat{b}_{l(M-1)})^T$ of the Legendre coefficients.

If necessary, the channel taps can be reconstructed as truncated Legendre series using the coefficients $\hat{b}_{lm}$ as in equation (6)

$$\hat{h}_l[n] = \sum_{m=0}^{M-1} \hat{b}_{lm} p_m[n], \, l=0,\ldots,L-1. \quad (21)$$

However, the estimated BEM coefficients can be directly used for equalization, without actually creating the channel matrix (see [15]).

The proposed estimation of the BEM coefficients is not limited to the Legendre polynomials, but is applicable in general. The BEM coefficients are constructed from the Fourier coefficients by applying the matrix J, whose entries are computed in a way analogous to equation (18). In the general case, the integrals in (18) might not be available analytically, and are computed numerically instead.

3.4.2 Inverse Reconstruction Method

The idea of the Inverse Reconstruction Method is to reconstruct the channel taps $h_l$ from D Fourier coefficients as a linear combination of at most D basis functions. Specifically, given the Fourier coefficients, the channel tap $h_l$ is approximated by a linear combination $\hat{h}_l$ of the first D basis functions which have the same Fourier coefficients as $h_l$. For further details on inverse reconstruction methods, see [21].

3.5 Algorithm Summary and Complexity

The proposed channel estimation algorithm as applied to one OFDM symbol, assuming that OFDM demodulation according to (3) has already been performed, and that the matrix J in (20) has been precomputed, can be summarized as follows.

TABLE 1

Operation count for the proposed algorithm per OFDM symbol obtained for K = 256, L = 32, D = 3, and M = 2 (as used in the simulations).

| step | description | operations | example |
|---|---|---|---|
| 1 | L-point IDFTs of $\tilde{Y}_k[i]$ | DL log L | 480 |
| 2 | computation of Fourier coefficients | DL | 96 |
| 3 | computation of BEM coefficients | MDL | 192 |

Step 0: Apply the size-L IDFT to each of the D sub-sequences $\tilde{Y}_i[d]$ according to (16).

Step 1: Compute the Fourier coefficient estimates $\hat{H}_l[d]$ according to (17).

Step 2: Calculate the estimates $\hat{b}_{lm}$ of the BEM coefficients via (19).

Conventional time-invariant least squares (LS) estimation [1] is a special case of this algorithm with model parameters D=1, M=1. It is essential for practical applications, that the estimated BEM coefficients can be directly used for equalization, without ever creating the channel matrix (see [15]).

In Table 1 reports the computational complexity of this scheme in complex floating point operations. Step 1 requires DL log L complex operations, while Step 2 uses DL complex multiplications. Step 3 requires DM complex operations per tap, with the total of DML complex operations. Altogether, the proposed algorithm performs D(log L+M+1)L complex floating point operations. For comparison, the estimation method presented in [3] requires at least $DML^2$ operations.

The precomputed matrix J is dimensioned M×D, and its storage is trivial (typically M≤D≤3). The estimated Fourier coefficients are stored as DL floating point complex numbers, while the estimated BEM coefficients are stored as ML complex numbers. Typically D≥M, and the Fourier coefficients are discarded during the computation of the BEM coefficients. Overall, the proposed algorithm stores approximately DL complex numbers (in addition to the receive signal). On the other hand, the method of [3] requires at least $DML^2$ of storage, so the improvement is extraordinary.

4 Numerical Simulations 4.1 Setup

The considered transmission simulation setup conforms to mobile WiMAX standards (IEEE 802.16e), but the method is general, and allows a variety of OFDM transmission schemes. A coded OFDM system with K=256 subcarriers is simulated, transmit bandwidth B=2.8 MHz, and carrier frequency $f_c$=5.8 GHz. The length of the cyclic prefix is $L_{cp}$=32, and the total symbol duration is 102.9 µs. The information bits are encoded using a convolutional code of rate ½, passed through an interleaver, and mapped to 4-QAM symbols. Pilots are inserted as described in Subsection 3.2. The MATLAB Communications Toolbox is used to create a Rayleigh fading channel with a maximum delay of 11.4 µs, which corresponds to the worst case of $L=L_{cp}$=32 taps. All channel taps have an average path gain of −2 dB, and a Jakes Doppler spectrum. This channel model is chosen only for illustration, this method does not make any particular assumptions about the wireless channel. The normalized Doppler frequency ν is related to the receiver velocity v by the formula $$v = \frac{v}{c} f_c T_s K, \quad (22)$$

where $f_c$ is the carrier frequency, $$\frac{1}{T_s K}$$

is the intercarrier frequency spacing, and c is the speed of light. The receiver performs channel estimation followed by the MMSE equalization [22] and decoding. The results obtained by this estimator (using D=3 Fourier modes and M=2 Legendre polynomials) are compared with those obtained by conventional time-invariant LS estimation for frequency selective channels (see [1]), with those obtained by an estimator based on the CE-BEM with D=3 complex exponentials, and with results obtained using the method of [3]. Each of the schemes uses the same density of pilots. Additionally, the bit error rate (BER) obtained using the exact channel state information (CSI) is reported. The normalized mean squared error (NMSE) is computed as the expected mean square error between the exact channel tap $h_l(t)$, and the estimated channel tap $\hat{h}_l(t)$, normalized by the power of the exact channel. The BER and the NMSE are computed by averaging over 100,000 OFDM symbols in order to capture even extremely low BERs.

4.2 Results of Simulations

Figure 3:
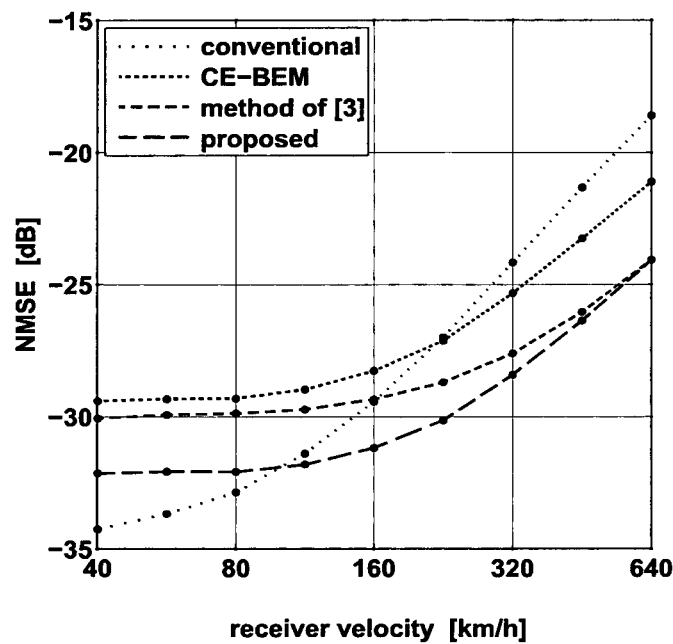
Figure 3:
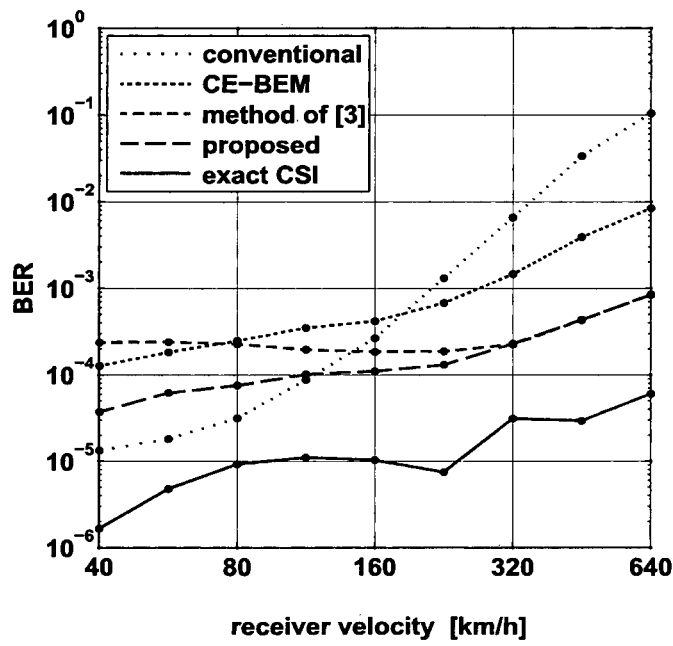

FIG. 3 shows the BER and the NMSE as functions of the receiver velocity for a fixed signal-to-noise ratio (SNR) with $E_b/N_0$=20 dB. Here, $E_b$ denotes the energy per data bit, excluding the pilots, and $N_0$ is the variance of the AWGN. As expected, the performance deteriorates with increasing velocity. For the chosen system parameters, conventional time-invariant LS estimation is the best of all the methods at velocities less than 113 km/h (5.6% normalized Doppler). LS estimation is a special case of the proposed estimation algorithm with the Fourier model order D=1 and the Legendre model order M=1. For rapidly varying channels occurring at velocities over 113 km/h, this estimator with the Fourier model order D=3 and the Legendre model order M=2 performs best, having approximately one order of magnitude lower a BER than that of the CE-BEM. Consequently, the proposed method allows us to adapt the model order to the severity of the Doppler effect for better estimation. The proposed algorithm consistently gives a lower BER than the method of [3], but approximately one order of magnitude greater than the one obtained using the exact CSI.

Figure 4:
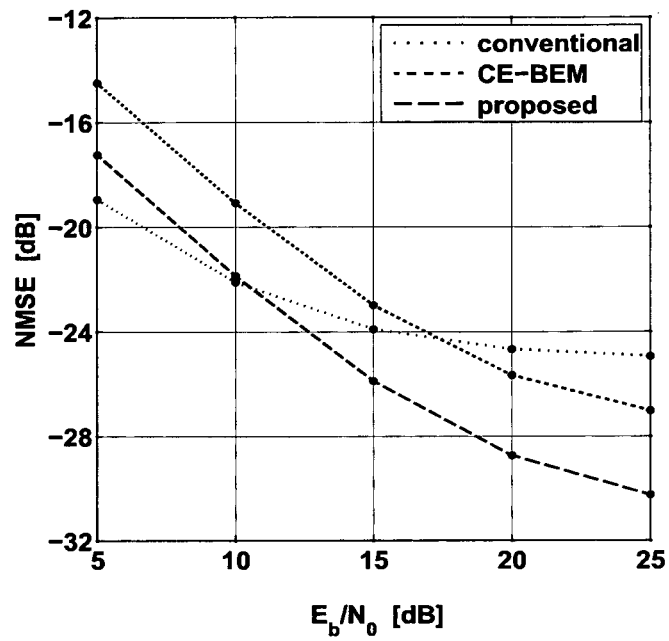
Figure 4:
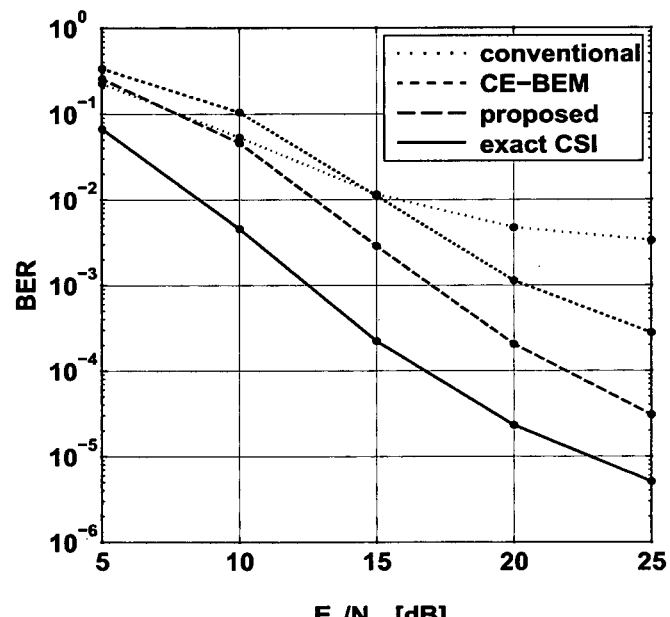

FIG. 4 shows the BER and the NMSE as functions of the SNR at a fixed receiver velocity of 300 km/h. This velocity corresponds to a maximum Doppler shift of 1.61 kHz, which is about 14.7% of the subcarrier spacing. From the vantage point of a stationary receiver, the Doppler effect of a moving reflector is twice as large as that of a moving transmitter. Consequently, the same Doppler effect is caused by a reflector moving with velocity 150 km/h, which is common in modern mobile environments.

The proposed scheme achieves a BER of 2.9e−3 at $E_b/N_0$=15 dB, and a BER of 2.0e−4 at $E_b/N_0$=20 dB. It consistently outperforms the LS and the CE-BEM-based estimation methods, especially at higher SNRs. At a BER of 1.0e−3, our estimator outperforms the CE-BEM by about 3 dB. Moreover, the proposed algorithm gives approximately one order of magnitude higher a BER than the one obtained with the exact CSI.

5 Conclusions

A novel, low-complexity channel estimator for OFDM systems reliable at high Doppler spreads is developed. The main idea is an FFT-based estimation of the Fourier coefficients of the channel taps, followed by a conversion to BEM coefficients. The BEM coefficients of the channel taps are computed from explicit formulas involving the pilot values and the receive signal. A preferred basis is that of the Legendre polynomials, but other bases can also be used. This method is meant to be combined with equalization algorithms, which only use the BEM coefficients, without actually creating the channel matrix.

Conventional time-invariant least-squares (LS) estimation is a method of choice for doubly-selective channels with low Doppler spreads. The proposed algorithm is aimed at doubly-selective channels with high Doppler spreads, corresponding to reflector velocities in the range of 60-200 km/h and a carrier frequency of 5.8 GHz. The LS estimation is a special case of the proposed method with the Fourier model order D=1 and the BEM model order M=1. At higher Doppler spreads, reliable channel estimates are obtained with higher models orders, at the expense of the transmission capacity.

For a system with L channels taps, this method uses O(L log L) operations and O(L) memory per OFDM symbol, which is the best possible up the order of magnitude. Previously published methods require $O(L^2)$ operations and $O(L^2)$ memory.

6 Appendix 6.1 Legendre Polynomials

The Legendre polynomial $P_n$ of degree n=0, 1, ..., is defined by the formula ([23], 22.11.5)

$$P_n(x) = \frac{1}{2^n n!} \frac{d^n}{dx^n} [(x^2 - 1)^n]. \quad (23)$$

For example, $$P_0(x) = 1, \quad (24)$$

$$P_1(x) = x, \quad (25)$$

$$P_2(x) = \frac{3}{2} x^2 - \frac{1}{2}. \quad (26)$$

6.2 Spherical Bessel Functions

The spherical Bessel function $j_n$ of the first kind and order n=0, 1, ..., is given by the following formula ([23], 10.1.25)

$$j_n(x) = x^n \left( -\frac{1}{x} \frac{d}{dx} \right)^n \frac{\sin x}{x}, \quad (27)$$

For example, $$j_0(x) = \frac{\sin x}{x}, \quad (28)$$

$$j_1(x) = \frac{\sin x}{x^2} - \frac{\cos x}{x}, \quad (29)$$

-continued $$j_2(x) = \left(\frac{3}{x^3} - \frac{1}{x}\right)\sin x - \frac{3}{x^2}\cos x. \quad (30)$$

The Fourier coefficients of the Legendre polynomials can be expressed in terms of the spherical Bessel functions $j_n$ ([24], 7.243)

$$\int_{-1}^{1} e^{jk\pi x} P_n(x) dx = 2(-j)^n j_n(k\pi). \quad (31)$$

REFERENCES

[1] S. Cofieri, M. Ergen, A. Puri, and A. Bahai. Channel estimation techniques based on pilot arrangement in OFDM systems. *IEEE Transactions on Broadcasting*, 48(3):223-229, September 2002.

[2] T. Zemen and C. F. Mecklenbrauker. Time-variant Channel Estimation Using Discrete Prolate Spheroidal Sequences. *IEEE Transactions on Signal Processing*, 53(9):3597-3607, September 2005.

[3] Z. Tang, R. C. Cannizzaro, G. Leus, and P. Banelli. Pilot-assisted time-varying channel estimation for OFDM systems. *IEEE Trans. Signal Processing*, 55(5):2226-2238, May 2007.

[4] Zijian Tang and G. Leus. Pilot schemes for time-varying channel estimation in OFDM systems. In *Proc. IEEE Workshop on Signal Processing Advances in Wireless Communications (SPAWC '07)*, pages 1-5, Helsinki (Finland), June 2007.

[5] Changyong Shin, J. G. Andrews, and E. J. Powers. An efficient design of doubly selective channel estimation for OFDM systems. *IEEE Trans. Wireless Communications*, 6(10):3790-3802, October 2007.

[6] H. A. Cirpan and M. K. Tsatsanis. Maximum likelihood blind channel estimation in the presence of Doppler shifts. *IEEE Trans. Signal Processing*, 47(6):1559-1569, June 1999.

[7] M. Guillaud and D. T. M. Slock. Channel modeling and associated intercarrier interference equalization for OFDM systems with high doppler spread. In Acoustics, Speech, and Signal Processing, 2003. *Proceedings. (ICASSP '03). 2003 IEEE International Conference on*, volume 4, pages 237-40, April 2003.

[8] T. Zemen, C. F. Mecklenbrauker, and R. R. Müller. Time variant channel equalization for MC-CDMA via Fourier basis functions. In *MC-SS Workshop* 2003, Oberpaffenhofen, Germany, pages 451-458, 2003.

[9] G. Leus. On the estimation of rapidly varying channels. In *Proc. of the European Signal Processing Conference (EU-SIPCO 2004)*, volume 4, pages 2227-2230, September 2004.

[10] T. Zemen and C. F. Mecklenbrauker. Time-variant channel equalization via discrete prolate spheroidal sequences. In *Signals, Systems and Computers*, 2003. *Conference Record of the Thirty-Seventh Asilomar Conference on*, volume 2, pages 1288-1292, November 2003.

[11] D. K. Borah and B. T. Hart. Frequency-selective fading channel estimation with a polynomial time-varying channel model. 47(6):862-873, June 1999.

[12] A. P. Kannu and P. Schniter. MSE-optimal training for linear time-varying channels. In *Acoustics, Speech, and Signal Processing*, 2005. *Proceedings. (ICASSP '05). IEEE International Conference on*, volume 3, March 2005.

[13] A. P. Kannu and P. Schniter. Design and analysis of MMSE pilot-aided cyclic-prefixed block transmission for doubly selective channels. *IEEE Trans. Signal Processing*, 56(3):1148-1160, March 2008.

[14] IEEE Draft Std 802.16e/D7. *Draft IEEE Standard for Local and Metropolitan Area Networks Part 16: Air Interface for Fixed and Mobile Broadband Wireless Access Systems*, 2005.

[15] T. Hrycak, S. Das, G. Matz, and H. G. Feichtinger. A method for channel equalization. Copending European Patent Application filed by the same applicant on the same day.

[16] D. Gottlieb and C.-W. Shu. On the Gibbs phenomenon and its resolution. *SIAM Review*, 39(4):644-668, 1997.

[17] Eitan Tadmor. Filters, mollifiers and the computation of the Gibbs phenomenon. *Acta Numer.*, 16:305-378, 2007.

[18] T. Driscoll and B. Formberg. A Pade-based algorithm for overcoming the Gibbs phenomenon. *Numer. Algorithms*, 26(1):77-92, 2001.

[19] J. P. Boyd. *Chebyshev and Fourier Spectral Methods*. Courier Dover, second revised edition, 2001.

[20] N. Gallagher, G. Wise, and J. Allen. A novel approach for the computation of Legendre polynomial expansions. *IEEE Trans. Acoustics, Speech, and Signal Processing*, 26(1):105-106, February 1978.

[21] Bernie D. Shizgal and Jae-Hun Jung. Towards the resolution of the gibbs phenomena. *J. Comput. Appl. Math.*, 161(1):41-65, 2003.

[22] T. Hrycak and G. Matz. Low-complexity time-domain ICI equalization for OFDM communications over rapidly varying channels. In *Proc. Asilomar Conf. on Signals, Systems, and Computers*, pages 1767-1771, Pacific Grove (CA), October/November 2006.

[23] M. Abramowitz and I. Stegun. *Handbook of Mathematical Functions*. Dover, New York, 1965.

[24] I. S. Gradshteyn and I. M. Ryzhik. *Table of Integrals, Series, and Products*. Academic Press, 7 edition, 2007.

The invention claimed is:

1. A method of estimating basis expansion model (BEM) coefficients of channel taps of a transmission channel of an orthogonal frequency-division multiplexing (OFDM) system having a given pilot arrangement, comprising, at a receiver side of the transmission channel,
   a) subsampling a received OFDM symbol in the frequency domain into a set of subsequences,
   b) inverse Fourier transforming each subsequence in the set of subsequences into a transformed subsequence, and
   c) estimating Fourier coefficients of a truncated Fourier series expansion model of the channel taps from the set of transformed subsequences.

2. The method of claim 1 for estimating BEM coefficients other than complex exponential BEM (CE-BEM) coefficients, further comprising
   d) calculating the BEM coefficients from said estimated Fourier coefficients.

3. The method of claim 1 wherein said pilot arrangement is a frequency domain Kronecker delta arrangement.

4. The method of claim 1, wherein the subsampling of a) is performed according to $$\tilde{Y}_d[i] = Y[k_0 + D^+ + d + iI],$$

with $i=0, \ldots, L-1$; $d=0, \ldots, D-1$; $I=K/L$; and $D^+=\lfloor D/2 \rfloor$,
Y being a received symbol in the frequency domain,
K being a symbol length,
D being a number of subsequences, L being a number of channel taps,
$k_0$ being an offset, and
$\tilde{Y}_d$ being a dth subsequence.

5. The method of claim 1, wherein b) is performed using an inverse discrete Fourier transform (IDFT).

6. The method of claim 1, wherein c) is performed according to $$\hat{H}_l[d] = \frac{1}{a_0 \sqrt{L}} e^{j2\pi \frac{l(k_0+D^-)}{K}} \tilde{y}_{d-D^-}[l],$$

$\tilde{y}_{d-D^-}[l]$ being the $(d-D^-)$th transformed subsequence, with $l=0,\ldots,L-1$, and $\hat{H}_l[d]$ being the dth Fourier coefficient of the lth channel tap.

7. The method of claim 2, wherein said BEM coefficients are coefficients of an expansion model based on Legendre polynomials.

8. The method of claim 2, wherein d) is performed by linear mapping.

9. The method of claim 7, wherein:
d) is performed by linear mapping, and
d) is performed by applying an M×D projection matrix with entries equal to Fourier coefficients of basis functions.

10. The method of claim 7, wherein:
d) is performed by linear mapping, and
d) is performed made by applying a Moore-Penrose pseudoinverse of a D×M matrix with entries equal to basis coefficients of Fourier modes.

* * * * *